US008629218B2

(12) United States Patent
Kania et al.

(10) Patent No.: US 8,629,218 B2
(45) Date of Patent: Jan. 14, 2014

(54) CURABLE FILM-FORMING COMPOSITIONS CONTAINING ORTHO-HYDROXYL AROMATIC FUNCTIONAL ACRYLIC POLYMERS

(75) Inventors: Charles M. Kania, Natrona Heights, PA (US); Lyle L. Foringer, Worthington, PA (US); Shiryn Tyebjee, Allison Park, PA (US); Leigh Ann Humbert, Pittsburgh, PA (US); Kevin C. Olson, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 722 days.

(21) Appl. No.: 12/779,491

(22) Filed: May 13, 2010

(65) Prior Publication Data

US 2011/0281115 A1 Nov. 17, 2011

(51) Int. Cl.
| | |
|---|---|
| *C08F 212/14* | (2006.01) |
| *C08F 220/26* | (2006.01) |
| *C08F 220/06* | (2006.01) |
| *C08F 220/28* | (2006.01) |
| *C08F 8/00* | (2006.01) |

(52) U.S. Cl.
USPC .......... 525/329.5; 525/329.7; 525/330.3; 525/384; 525/386; 526/318.1; 526/318.4; 526/318.5; 526/320; 526/328.5; 526/329.5; 526/329.7; 528/271; 528/272; 528/306; 528/308

(58) Field of Classification Search
USPC ............ 525/329.5, 329.7, 330.3, 384, 386; 526/318.1, 318.4, 318.5, 320, 328.5, 526/329.5, 329.7; 528/271, 272, 306, 308
See application file for complete search history.

(56) References Cited

U.S. PATENT DOCUMENTS

| | | | | |
|---|---|---|---|---|
| 3,167,583 | A | | 1/1965 | Goldberg et al. |
| 4,031,051 | A | * | 6/1977 | Dowbenko et al. ............ 528/100 |
| 4,397,989 | A | * | 8/1983 | Adesko ........................... 525/162 |
| 5,447,767 | A | * | 9/1995 | Tanabe et al. ................. 428/64.4 |
| 5,866,294 | A | * | 2/1999 | Oguni et al. ................... 430/166 |
| 5,959,037 | A | * | 9/1999 | Saito et al. ..................... 525/199 |

* cited by examiner

*Primary Examiner* — Roberto Rabago
(74) *Attorney, Agent, or Firm* — Krisanne Shideler

(57) ABSTRACT

The present invention is directed to curable film-forming compositions comprising a film-forming resin and a crosslinking agent. The film-forming resin contains a polymer having functional aromatic groups derived from functional aromatic acids. The present invention further provides multi-component composite coating compositions comprising a first film-forming composition applied to a substrate to form a primer or base coat, and a second film-forming composition applied on top of the primer or base coat to form a top coat, the top coat comprising the composition described above. Coating compositions prepared from the curable compositions of the present invention demonstrate superior gloss and acid etch resistance properties, making them ideally suited for automotive applications.

17 Claims, No Drawings

CURABLE FILM-FORMING COMPOSITIONS CONTAINING ORTHO-HYDROXYL AROMATIC FUNCTIONAL ACRYLIC POLYMERS

FIELD OF THE INVENTION

The present invention relates to curable film-forming compositions prepared from acrylic polymers having hydroxyl functional aromatic groups.

BACKGROUND OF THE INVENTION

Color-plus-clear coating systems that include a colored or pigmented base coat applied to a substrate followed by a transparent or clear topcoat applied on top of the base coat have long been the standard as original finishes for automobiles. The color-plus-clear systems have excellent aesthetic properties such as outstanding gloss and distinctness of image. The clear coat is particularly important for these properties.

Since the 1980's, damage to automotive coatings due to acid rain and other environmental acid has been a problem. Damage caused by acid exposure is particularly noticeable in automotive clear coats. Degradation of coating systems, which is caused by acid catalyzed hydrolysis of chemical bonds in the coating, can cause permanent surface blemishes, often appearing as groups of small pits resembling water spots or irregularly-shaped, rough-floored, low gloss depressions. Because of incident exposure to acidic environments such as acid rain, fog, and dew, it is essential that coating compositions used in automotive applications be resistant to degradation caused by acid exposure.

Prior art attempts to improve the acid etch resistance of coating compositions have included alternative chemistries that are less vulnerable to acid attack. Certain of these chemistries require expensive crosslinking agents or other components, and/or involve products of uncertain supply.

It would be desirable to provide new curable film-forming compositions yielding cured coatings that exhibit excellent acid etch resistance, while maintaining high gloss and other appearance and performance properties. Such compositions should use relatively inexpensive and easily prepared components, made from readily available ingredients and reactants.

SUMMARY OF THE INVENTION

The present invention is directed to curable film-forming compositions comprising a film-forming resin and a crosslinking agent. The film-forming resin contains a polymer containing functional aromatic groups derived from functional aromatic acids. In certain embodiments the functional aromatic acids are hydroxyl functional aromatic acids.

The present invention further provides multi-component composite coating compositions comprising a first film-forming composition applied to a substrate to form a primer or base coat, and a second film-forming composition applied on top of the primer or base coat to form a top coat. The top coat comprises the composition described above.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive groups occurs, the rate of reaction of the remaining unreacted reactive groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The curable film-forming compositions of the present invention comprise a film-forming resin and a crosslinking agent. The film-forming resin comprises a polymer containing functional aromatic groups derived from functional aromatic acids having the structure:

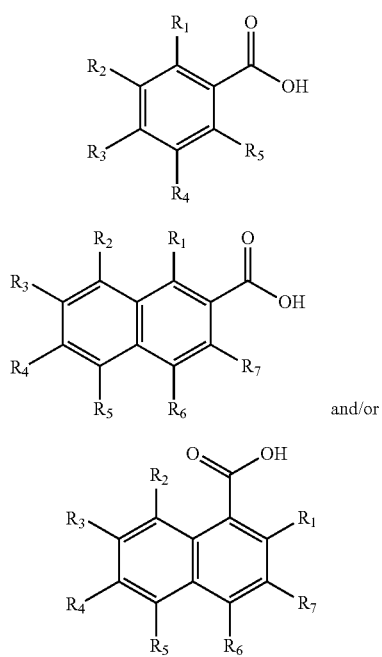

wherein $R_1$ to $R_7$ are each independently —H; —OH; $C_1$ to $C_{18}$ alkyl or aryl; —OR; —OCOR; —OCO$_2$R; —NH$_2$; —NHR; —NHRR'; —NHCOR; —NRCOR'; —SH; —SR; —SCOR; where R and R' are each independently $C_1$ to $C_{18}$ aryl or alkyl; and provided that at least one of the substituents $R_1$ to $R_7$ is attached to the aromatic ring through a —O—, —N—, or —S— linkage.

The polymer containing functional aromatic groups may be a reaction product of a polymer having functional groups that are reactive with carboxylic acids and at least one functional aromatic acid having structure I, II or III. This may be done by using an epoxy functional ethylenically unsaturated monomer or other monomer with functional groups that are reactive with carboxylic acids, such as any of those listed below in the reaction mixture to form the polymer and then post-reacting the functional groups in the resulting polymer with an aromatic functional acid. Alternatively, the polymer-containing functional aromatic groups may be prepared from an aromatic functional monomer comprising a reaction product of an acrylate or methacrylate having functional groups that are reactive with carboxylic acids and at least one functional aromatic acid having structure I, II or III.

In particular embodiments of the present invention, the film-forming resin comprises a polymer containing hydroxyl functional aromatic groups. The polymer is typically an addition copolymer and may be prepared from, inter alia, an ethylenically unsaturated aromatic hydroxyl functional monomer comprising a reaction product of (i) an acrylate or methacrylate having functional groups that are reactive with carboxylic acids and (ii) a hydroxyl functional aromatic acid.

Acrylates and methacrylates having any functional groups that are reactive with carboxylic acids are suitable. For example, epoxy functional monomers such as glycidyl acrylate, glycidyl methacrylate, allyl glycidyl ether, methallyl glycidyl ether, and the like, may be used.

The hydroxyl functional aromatic acid may comprise o-hydroxy benzoic acid, 3,4-dihydroxybenzoic acid, 3,5-dihydroxybenzoic acid, 3-hydroxybenzoic acid, 5-hydroxy-2-methylbenzoic acid, 3-hydroxy-4-methylbenzoic acid, 2,3-dihydroxybenzoic acid, 2,5-dihydroxybenzoic acid, 4-hydroxybenzoic acid, 4-hydroxy-3-methylbenzoic acid, 4-hydroxy-2-methylbenzoic acid, 3,4-dihydroxybenzoic acid, 2,6-dihydroxybenzoic acid, 2,4-dihydroxybenzoic acid, 5-fluorosalicylic acid, 4-fluorosalicylic acid, 2-fluoro-6-hydrobenzoic acid, 3-methylsalicylic acid, 5-methylsalicylic acid, 4-methylsalicylic acid, 3,4,5-trihydroxybenzoic acid, 2,4,5-trihydroxybenzoic acid, 2,3,4-trihydroxybenzoic acid, 2-hydroxy-3-methoxybenzoic acid, 4-hydroxy-3-methoxybenzoic acid, 2-hydroxy-5-methoxybenzoic acid, 3-hydroxy-4-methoxybenzoic acid, 1-hydroxy-2-naphthoic acid, 6-hydroxy-2-naphthoic acid, and/or 3-hydroxy-2-naphthoic acid.

In certain embodiments of the present invention, the aromatic hydroxyl functional monomer comprises an o-hydroxy aromatic acid, in particular, o-hydroxy benzoic acid. The aromatic hydroxyl functional monomer typically makes up 5 to 40 percent by weight, such as 25 to 40 percent by weight, often 30 percent by weight of the monomers used to prepare the polymer.

Alternatively, aromatic hydroxyl functional groups may be introduced into the polymer after polymerization, by using an epoxy functional ethylenically unsaturated monomer or other monomer with functional groups that are reactive with carboxylic acids, such as any of those listed above in the reaction mixture to form the polymer and then post-reacting the functional groups in the resulting polymer with an aromatic hydroxyl functional acid.

It has been observed by the inventors that the film-forming compositions of the present invention, particularly those comprising polymers containing o-hydroxyl aromatic functional groups, exhibit lower viscosity than film-forming compositions prepared using similar polymers without such functionality. These polymers allow for formulation of high solids compositions, e.g., at least 55 percent by weight solids based on the total weight of the film-forming composition.

Other monomers used to prepare the polymer in the film-forming resin include at least one ethylenically unsaturated monomer such as alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and usually 4 to 18 carbon atoms in the alkyl group. Non-limiting examples include methyl methacrylate, ethyl methacrylate, butyl methacrylate, ethyl acrylate, butyl acrylate, lauryl methacrylate, isobornyl methacrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

Beta-hydroxy ester functional monomers can be used to prepare the polymer used in the film-forming resin, and may be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are used most often. Examples of carboxylic acids include, but are not limited to, saturated monocarboxylic acids such as isostearic acid and aromatic unsaturated carboxylic acids such as benzoic acid.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl)phenyl glycidyl ether. Preferred glycidyl esters include those of the structure:

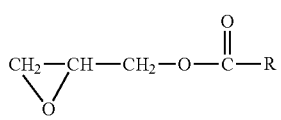

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co. These monomers typically make up 30 to 50 percent by weight, often 40 percent by weight of the monomers used to prepare the polymer.

The acrylic copolymer can include additional hydroxyl functional groups, which are often incorporated into the polymer by including one or more other hydroxyl functional monomers in the reactants used to produce the polymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates. The acrylic polymer can also be prepared with N-(alkoxymethyl)acrylamides and N-(alkoxymethyl)methacrylamides.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other useful carbamate functional monomers are disclosed in U.S. Pat. No. 5,098,947, which is incorporated herein by reference. Other useful carbamate functional monomers are disclosed in U.S. Pat. No. 5,098,947, which is incorporated herein by reference.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of the aqueous coating compositions, or can be prepared via organic solution polymerization techniques with groups capable of salt formation such as acid or amine groups. Upon neutralization of these groups with a base or acid the polymers can be dispersed into aqueous medium. Generally any method of producing such polymers that is known to those skilled in the art utilizing art recognized amounts of monomers can be used.

In a particular embodiment of the present invention, the film-forming resin comprises an acrylic polymer prepared from 10 to 20 percent by weight, usually 13 percent by weight styrene, 15 to 20 percent by weight, usually 17 percent by weight 2-ethylhexyl acrylate, 25 to 40 percent by weight, usually 30 percent by weight of a reaction product of glycidyl methacrylate and o-hydroxy benzoic acid, and 30 to 50 percent by weight, usually 40 percent by weight of a reaction product of acrylic acid and CARDURA E.

In certain embodiments of the present invention, the film-forming resin further comprises a polyester polyol. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Other functional groups such as amide, thiol, urea, carbamate, and thiocarbamate may be incorporated into the polyester or alkyd resin as desired using suitably functional reactants if available, or conversion reactions as necessary to yield the desired functional groups, provided the final product has at least some hydroxyl functional groups. Such techniques are known to those skilled in the art.

When the polyester polyol is present, it makes up 5 to 40 percent by weight of the film-forming resin.

The curable film-forming composition of the present invention further comprises a crosslinking agent. Suitable crosslinking materials include aminoplasts, polyisocyanates, polyacids, anhydrides and mixtures thereof. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, and 2-mercapto-4,6-diaminopyrimidine.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. Many aminoplast resins are partially alkylated with methanol or butanol.

Particularly suitable aminoplast crosslinking agents are high imino-functional melamines such as those sold under the name SETAMINE, available from Nuplex Resins LLC.

Polyisocyanates that may be utilized as crosslinking agents can be prepared from a variety of isocyanate-containing materials. Often, the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime, lactams such as caprolactam and pyrazoles such as dimethyl pyrazole.

Examples of polycarboxylic acids that are suitable for use as the crosslinking agent in the curable film-forming composition of the present invention include those described in U.S. Pat. No. 4,681,811, at column 6, line 45 to column 9, line 54.

Suitable polyanhydrides include those disclosed in U.S. Pat. No. 4,798,746, at column 10, lines 16-50, and in U.S. Pat. No. 4,732,790, at column 3, lines 41 to 57.

Generally, the crosslinking agent is present in an amount ranging from 5 to 50 percent by weight, based on the total resin solids of the curable film-forming composition, often 15 to 30 percent by weight.

The curable film-forming compositions of the present invention may contain adjunct ingredients conventionally used in coating compositions. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to about 40% by weight based on the total weight of resin solids.

The curable film-forming compositions of the present invention may be waterborne or solventborne. Suitable solvent carriers include the various esters, ethers, and aromatic solvents, including mixtures thereof, which are known in the art of coatings formulation. The composition typically has a total solids content of about 40 to about 80 percent by weight. The compositions of the present invention will often have a VOC content of less than 4 percent by weight, typically less than 3.5 percent by weight and many times less than 3 percent by weight.

The curable film-forming compositions of the present invention may contain color pigments conventionally used in surface coatings and may be used as high gloss monocoats; that is, high gloss pigmented coatings. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

Film-forming compositions of the present invention, particularly those comprising polymers containing o-hydroxyl aromatic functional groups, demonstrate an increase in brightness as measured by dullness, luster, and sharpness of up to 40%, depending on the base coat color, using the BYK Wavescan/DOI manufactured by BYK Gardner, compared to film-forming compositions prepared using similar polymers without such functionality.

Suitable color pigments that may be used in a monocoat include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include, in particular, aluminum flake, copper bronze flake, and metal oxide coated mica, nickel flakes, tin flakes, and mixtures thereof.

In general, the pigment is incorporated into the film-forming composition in amounts up to about 80 percent by weight based on the total weight of coating solids. The metallic pigment is employed in amounts of about 0.5 to about 25 percent by weight based on the total weight of coating solids.

The curable film-forming compositions of the present invention may be curable at ambient temperatures or elevated temperatures, depending on the crosslinking chemistry employed. The film-forming compositions of the present invention alternatively may be used as automotive primers, electrodepositable primers, base coats, clear coats, and monocoats, as well as in industrial and other applications. They are most suitable as topcoats, in particular, clear coats and monocoats, by virtue of their high gloss and acid etch resistance properties as discussed below. The compositions may be easily prepared by simple mixing of the ingredients, using formulation techniques well known in the art.

The curable film-forming compositions of the present invention may be used as one or more layers of a multi-layer composite coating composition, such as a color-plus-clear composite coating, as noted below. For example, the composition may serve as a colored base coat and/or as a transparent topcoat in the same multi-component composite coating composition. The film-forming composition may also be used in combination with other coatings in a composite coating composition.

The multi-component composite coating compositions of the present invention comprise a first film-forming composition applied to a substrate and a second film-forming composition applied on top of the first. The first film-forming composition may be any film-forming composition known in the art, or it may alternatively be a curable film-forming composition of the present invention as described above. The second film-forming composition comprises a curable film-forming composition of the present invention as described above.

The compositions of the present invention may be applied over any of a variety of substrates such as metallic, glass, wood, and/or polymeric substrates, and can be applied by conventional means including but not limited to brushing, dipping, flow coating, spraying and the like. They are most often applied by spraying. The usual spray techniques and equipment for air spraying, airless spraying, and electrostatic spraying employing manual and/or automatic methods can be used. Suitable substrates include but are not limited to metal substrates such as ferrous metals, zinc, copper, magnesium, aluminum, aluminum alloys, and other metal and alloy substrates typically used in the manufacture of automobile and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used.

The compositions of the present invention may also be applied over elastomeric or plastic substrates such as those that are found on motor vehicles. By "plastic" is meant any of the common thermoplastic or thermosetting synthetic non-conductive materials, including thermoplastic olefins such as polyethylene and polypropylene, thermoplastic urethane, polycarbonate, thermosetting sheet molding compound, reaction-injection molding compound, acrylonitrile-based materials, nylon, and the like.

In certain embodiments, the present invention is directed to multi-component composite coating compositions comprising a base coat deposited from a pigment-containing base coating composition, which can comprise any of the aforementioned curable coating compositions, and a topcoat deposited from any of the coating compositions of the present invention previously described above. In one embodiment, the present invention is directed to a multi-component composite coating composition as previously described, wherein the topcoating composition is transparent after curing and is selected from any of the compositions previously described. The components used to form the topcoating composition in these embodiments can be selected from the coating components discussed above, and additional components also can be selected from those recited above. Again, one or both of the base coating composition and the top coating composition can be formed from the curable coating compositions of the present invention.

Before depositing any treatment or coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents that are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate to which the composition of the present invention is applied may be a bare, cleaned surface; it may be oily, pretreated with one or more pretreatment compositions, and/or prepainted with one or more coating compositions, primers, etc., applied by any method including, but not limited to, electrodeposition, spraying, dip coating, roll coating, curtain coating, and the like.

Where the base coat is not formed from a composition of the present invention (but the topcoat is formed from a curable coating composition of the present invention) the coating composition of the base coat in the color-plus-clear system can be any composition useful in coatings applications, particularly automotive applications. The coating composition of the base coat can comprise a resinous binder and a pigment and/or other colorant, as well as optional additives well known in the art of coating compositions. Nonlimiting examples of resinous binders are acrylic polymers, polyesters, alkyds, and polyurethanes.

The first film-forming compositions can be applied to any of the substrates described above by any conventional coating techniques such as those described above, but are most often applied by spraying. The usual spray techniques and equipment for air spraying, airless spray, and electrostatic spraying employing either manual or automatic methods can be used. Resultant film thicknesses may vary as desired.

After forming a film of the first composition on the substrate, the coating can be cured or alternatively given a drying step in which at least some of the solvent is driven out of the film by heating or an air drying period before application of the second film-forming composition. Suitable drying conditions may depend, for example, on the particular composition, and on the ambient humidity if the composition is waterborne.

The second composition can be applied to the first by any conventional coating technique, including, but not limited to, any of those disclosed above. The second composition can be applied to a cured or to a dried coating layer before the first composition has been cured. In the latter instance, the two coatings can then be heated to temperatures and for a time sufficient to cure both coating layers simultaneously.

A second topcoat coating composition can be applied to the first topcoat to form a "clear-on-clear" topcoat. The first topcoat coating composition can be applied over the base coat as described above. The second topcoat coating composition can be applied to a cured or to a dried first topcoat before the base coat and first topcoat have been cured. The base coat, the first topcoat and the second topcoat can then be heated to cure the three coatings simultaneously.

It should be understood that the second transparent topcoat and the first transparent topcoat coating compositions can be the same or different provided that, when applied wet-on-wet, one topcoat does not substantially interfere with the curing of the other, for example, by inhibiting solvent/water evaporation from a lower layer. Moreover, both the first topcoat and the second topcoat can be the curable coating composition of the present invention. Alternatively, only the second topcoat may be formed from the curable coating composition of the present invention.

If the first topcoat does not comprise the curable coating composition of the present invention, it may, for example, include any crosslinkable coating composition comprising a thermosettable coating material and a curing agent.

Typically, after forming the first topcoat over the base coat, the first topcoat is given a drying step in which at least some solvent is driven out of the film by heating or, alternatively, an air drying period or curing step before application of the second topcoat. Suitable drying conditions will depend on the particular film-forming compositions used.

In certain embodiments of the present invention, the curable film-forming compositions of the present invention, after being applied to a substrate as a coating and after curing, demonstrate high gloss as described above and improved acid etch resistance compared to a similar curable film-forming composition that contains a similar film-forming resin comprising a similar polymer that does not contain aromatic hydroxyl functional groups. Acid etch resistance may be measured by standard tests GME 60408 and GME-60409, or by Florida exposure.

Coated test panels measuring at least 4"×8" (10.16 cm×20.32 cm) are exposed in Jacksonville, Fla. from the last week of May through the last week of August of a calendar year. This is the standard location and exposure period (summer months) established by the North American automobile manufacturers. Upon exposure completion, the panels are hand washed with soap and water, and then rinsed with water. The rinse water is removed by squeegee, and then the panels are allowed to dry at room temperature. The panels are rated on a scale of 0 to 10 against a set of reference standards comparable to those used by General Motors Company. A rating of '0' is outstanding, with no visible etching or waterspotting. The severity of etch steadily increases up through the rating of '10', which is severe etching and waterspotting. The determination of the photo-oxidation rate of a coating may be performed according to Ford Motor Company's Exterior Paint Weathering Test Method PA-0148, DVM-5867.

The following examples are intended to illustrate various embodiments of the invention, and should not be construed as limiting the invention in any way.

RESIN SYNTHESIS EXAMPLES

Example 1

Preparation of Copolymerizable Monomer Derived from Salicylic Acid

To a 5 liter round bottom flask equipped with an air driven agitator, thermocouple and heating source, the following components were charged.
Glycidyl Methacrylate—1666.63 grams
Salicylic Acid—1641.97 grams
Ionol—16.49 grams
Triphenyl Phosphite—3.30 grams The reactor was heated to 64° C. At 64° C. heat was removed and the reaction allowed to erxotherm. The reaction exothermed to maximum 169° C. The reaction was cooled to 120° C. and held for acid value of less than 1.

Examples 2A, 2B, 2C, 2D

The following base polymers were made in 5 liter round bottom flasks equipped with an air driven agitator, thermocouple, heating source, and feed ports.

The reactor was charged with 525.4 grams of hexyl acetate and heated to reflux to about 167C. An initiator solution comprising 238.8 grams of hexyl acetate and 178.4 grams of t-amyl peroxyacetate (LUPEROX 555 available from Arkema) was added over a three period while maintaining reflux conditions. Simultaneously the following compositional variations were feed along with the initiator solution.

|  | 2A | 2B | 2C | 2D |
| --- | --- | --- | --- | --- |
| Glycidyl Methacrylate | 855.9 g | 642.0 g | 427.9 g | 214.0 g |
| Butyl Methacrylate | 642.0 g | 749.0 g | 855.9 g | 962.9 g |
| Butyl Acrylate | 642.0 g | 749.0 g | 855.9 g | 855.9 g |

After the above initiator and monomers feeds were complete a solution of 81.5 grams of hexyl acetate and 35.3 grams of t-amyl peracetate were added over a one hour period under reflux conditions. The reaction was then held and additional hour after completion of this feed. The polymer non-volatile content as measured by 110 C/1 hour solids of the solutions were 66.32%, 66.97%, 67.62%, and 66.46% respectively.

Each of the above base polymers were reacted with salicylic acid as follows.

|  | 2A | 2A | 2A | 2B | 2C | 2D |
| --- | --- | --- | --- | --- | --- | --- |
| Wt. Base Polymer from above | 914.5 g | 877.9 g | 803.3 g | 750.0 g | 750.0 g | 750.0 g |
| Wt. Salicylic Acid | 63.8 g | 122.5 g | 168.1 g | 138.4 g | 97.3 g | 48.6 g |
| Hexyl Acetate | 0 | 20.0 g | 35.0 g | 30.0 g | 0 | 0 |
| Epoxy EW | 761 | 1949 | 2410 | 11905 | 12658 | 11765 |
| Solids | 68.8% | 69.76% | 70.06% | 69.17% | 70.86% | 68.92% |
| Acid Value | 0 | 0 | 1.3 | 1.87 | 2.78 | 3.33 |

2 liter reactors were charged with the above base polymers along with the appropriate amount of salicylic acid and heated to about 115-120° C. The reactions were held at this temperature until the acid value is 5 or less.

Example 3

Preparation of Epoxy Functional Polymer Reacted with Salicylic Acid

In a 5 liter round bottom flasks equipped with an air driven agitator, thermocouple, heating source, and feed ports 982.95 g of SOLVESSO 100 (aromatic hydrocarbon solvent) was brought to reflux, about 161° C. A feed of monomer comprising the following was added to the refluxing solvent over a three hour period.
632.44 grams of an adduct derived from the reaction of one mole of acrylic acid and one mole of CARDURA E (available from Hexion)
316.54 grams of glycidyl methacrylate
353.79 grams of 2-ethyl hexyl acrylate
270.54 grams of styrene Simultaneously added along with the above monomers over a 3½ hour period was a solution of 88.65 grams di-t-butyl peroxide (available from Arkema) and 193.67 grams of SOLVESSO 100. A reflux temperature was maintained throughout the polymerization reaction. Upon completion of the feeds the epoxy equivalent weight was determined to be 1420. At this point 307.95 grams of salicylic acid were added to the reaction and held for about one hour at 160° C. After the one hour hold the epoxy equivalent weight was determined to be 166,667 indicating completion of reaction. The polymer had a non-volatile polymer content of 63.89%, acid value of 0.4 and a Mw as determined by GPC of 5570.

Example 4

Preparation of Polymer Using Monomer from Example 1

1664.88 grams of an adduct derived from the reaction of one mole of acrylic acid and one mole of CARDURA E (available from Hexion)
1248.66 grams of monomer from Example 1
707.58 grams of 2-ethyl hexyl acrylate
541.08 grams of styrene Simultaneously added along with the above monomers over a 3½ hour period was a solution of 208.12 grams di-t-butylperoxide (available from Arkema) and 387.34 grams of SOLVESSO 100. A reflux temperature of about 160° C. was maintained throughout the reaction and upon completion of the above feeds, the reaction was held an additional hour. The polymer had a non-volatile polymer content of 65.12%, and an Mw of about 6500.

Examples 5A, 5B, and 5C

Preparation of Polymers with Different Levels of Monomer from Example 1

To a reactor the following mix of solvents were added, 593.17 grams of SOLVESSO 100 and 928.95 grams of methyl isobutyl ketone and heated to about 118° C. The reactor vessel was then sealed to a pressure of about 21 psi and heating continued to 160° C. The following polymer compositions were then prepared by adding the monomer feed over a three hour period along with an initiator feed comprising 104.06 grams of di-t-butyl peroxide and 193.67 grams of methyl isobutyl ketone over a 3½ hour period at 160° C.

|  | 5A | 5B | 5C | 5D |
|---|---|---|---|---|
| CARDURA E | 593.17 g | 593.17 g | 593.17 g | 593.17 g |
| Styrene | 795.19 g | 587.08 g | 387.97 g | 483.01 g |
| 2-Ethyl Hexyl Acrylate | 210.18 g | 210.18 g | 210.18 g | 210.18 g |
| Acrylic Acid | 274.48 g | 274.48 g | 274.48 g | 274.48 g |
| Monomer from Example 1 | 208.11 g | 416.22 g | 624.33 g | 520.26 g |

FORMULATION EXAMPLES

In each of the formulation examples, ingredients were mixed together under agitation to prepare a coating composition.

Example 1

Control

| Ingredient | Solid Weight (grams) | Weight (grams) |
|---|---|---|
| Xylene[1] |  | 5.98 |
| Butyl cellosolve acetate[2] |  | 2.15 |
| n-Butyl acetate[3] |  | 4.48 |
| Butyl carbitol[4] |  | 4.12 |
| n-Butyl alcohol[5] |  | 0.54 |
| Butyl Diglycol Acetate[6] |  | 4.3 |
| Tinuvin 1130[7] | 0.72 | 0.72 |
| Tinuvin 292[8] | 0.54 | 0.54 |
| Fumed silica dispersion[9] | 2.24 | 6.27 |
| Crosslinker[10] | 3.94 | 3.94 |
| Crosslinker[11] | 28.56 | 39.66 |
| LAROTACT LR9018[12] | 3.76 | 7.52 |
| Acrylic Polyol[13] | 32.75 | 47.47 |
| Acrylic polyol[14] | 4.85 | 7.52 |
| Sag control agent[15] | 24.58 | 43.88 |
| Byk 325[16] | 0.09 | 0.18 |
| Blocked acid catalyst[17] | 0.24 | 0.72 |

[1]Solvent available from Ashland
[2]Solvent available from British Petroleum
[3]Solvent available from BASF Corp.
[4]Solvent available from Citgo Petroleum
[5]Solvent available from BASF Corp.
[6]Solvent available from Dow Chemical Co.
[7]UV absorber available from Ciba
[8]Light stabilizer available from Ciba
[9]A Fumed silica dispersion CONSISTING OF 8% Areosil R812S, a hydrophobic amorphous silica available from Degusa, milled in a polymer consisting of 20% hydroxy ethyl methacrylate, 30% styrene, 12% 2-ethyl hexyl acrylatr, 30% Cardura E, and 9% acrylic acid in a solvent blend of 65% aromatic 100 type and 35% xylene at 65% solids about 8K Mw.
[10]Melamine-Formaldehyde polymer solution available from Kunstharsfbriek Synthese B.V.
[11]Melamine-Formaldehyde polymer solution available from Cytec
[12]Blocked isocyanate auxiliary crosslinker available from BASF AG
[13]A polymer consisting of 13% hydroxy ethyl methacrylate, 11% styrene, 18% 2-ethyl hexyl acrylate, 24% caprolactone, 27% CARDURA E, and 7% acrylic acid in xylene solvent at 69% solids.
[14]A polymer consisting of 20% hydroxy ethyl methacrylate, 30% styrene, 12% 2-ethyl hexyl acrylatr, 30% Cardura E, and 9% acrylic acid in a solvent blend of 65% aromatic 100 type and 35% xylene at 65% solids about 8K Mw.
[15]A dispersion of 4% urea crystals in a polymer consisting of 20% hydroxy ethyl methacrylate, 30% styrene, 12% 2-ethyl hexyl acrylatr, 30% Cardura E, and 9% acrylic acid in a solvent blend of 65% aromatic 100 type and 35% xylene at 65% solids about 8K Mw.
[16]Solution of polyether modified methylalkylpolysiloxane copolymer available from Byk Chemie
[17]Blocked acid catalyst available from King Industries

Example 2

Control

| Ingredient | Solid Weight (grams) | Weight (grams) |
|---|---|---|
| Xylene[1] | | 26.2 |
| Butyl diglycol acetate[2] | | 7.01 |
| n-Butyl acetate[3] | | 3.81 |
| Tinuvin 928[4] | 0.86 | 0.86 |
| Tinuvin 292[5] | 0.76 | 0.76 |
| Tinuvin 400[6] | 0.85 | 1 |
| Fumed silica dispersion[7] | 3.6 | 8.36 |
| Crosslinker[8] | 3.92 | 3.92 |
| Crosslinker[9] | 28 | 35 |
| LAROTACT LR9018[10] | 3.72 | 7.44 |
| Acrylic Polyol[11] | 23.82 | 31.36 |
| Acrylic polyol[12] | 18.18 | 25.61 |
| Sag control agent[13] | 26.67 | 50.32 |
| Byk 325[14] | 0.1 | 0.2 |
| Byk 390[15] | 0.04 | 0.4 |
| Blocked acid catalyst[16] | 0.8 | 2.22 |

[1]Solvent available from Ashland
[2]Solvent available from Dow
[3]Solvent available from Citgo
[4]UV absorber available from Ciba
[54]UV absorber available from Ciba
[6]Light stabilizer available from Ciba
[7]A fumed silica dispersion consisting of 8% Areosil R812, a hydrophobic amorphous silica available from Degussa, milled in a polymer consisting of 20% hydroxy ethyl methacrylate, 30% styrene, 12% 2-ethyl hexyl acrylatr, 30% Cardura E, and 9% acrylic acid in a solvent blend of 65% aromatic 100 type and 35% xylene at 65% solids about 8K Mw.
[8]Melamine-Formaldehyde polymer solution available from Cytec
[9]Melamine-Formaldehyde polymer solution available from Cytec
[10]Blocked isocyanate auxiliary crosslinker available from BASF AG
[11]A polymer consisting of 21% hydroxy ethyl methacrylate, 19% styrene, 12% n-butyl acrylate, 36% CARDURA E, and 12% acrylic acid, in a 60/40 blend of an aromatic 100/150 type solvent.
[12]A polymer consisting of 18% hydroxy ethyl methacrylate, 25% styrene, 14% 4-hydroxy butyl acrylate, 26% 2-ethyl hexyl acrylate, and 18% caprolactone, in aromatic solvent.
[13]A dispersion of 4% urea crystals in a polymer consisting of 20% hydroxy ethyl methacrylate, 30% styrene, 12% 2-ethyl hexyl acrylatr, 30% Cardura E, and 9% acrylic acid in a solvent blend of 65% aromatic 100 type and 35% xylene at 65% solids about 8K Mw.
[14]Solution of acrylic copolymers available from Byk Chemie
[15]Blocked acid catalyst available from King Industries

Example 3A to 3D

Ladder Study

Examples 3A to 3D demonstrate the preparation of coating compositions in accordance with the present invention, using the resins of Resin Synthesis Examples 2A to 2D.

| Ingredient | Solid Weight (grams) | Weight (grams) |
|---|---|---|
| Xylene[1] | | 31.2 |
| Butyl cellosolve acetate[2] | | 2.01 |
| n-Butyl acetate[3] | | 3.81 |
| Tinuvin 928[4] | 0.86 | 0.86 |
| Tinuvin 292[5] | 0.76 | 0.76 |
| Tinuvin 400[6] | 0.85 | 1 |
| Fumed silica dispersion[7] | 3.6 | 8.36 |
| Crosslinker[8] | 3.92 | 3.92 |
| Crosslinker[9] | 26.72 | 33.4 |
| Acrylic Polyol of Resin Synthesis Examples 2A to 2D[10] | 10 | 15.38 |
| Acrylic polyol[11] | 37.63 | 49.53 |
| Sag control agentl[12] | 20 | 37.74 |
| Byk 325[13] | 0.01 | 0.07 |
| Acid catalyst[14] | 0.49 | 0.65 |

[1]Solvent available from Ashland
[2]Solvent available from British Petroleum
[3]Solvent available from Citgo
[4]UV absorber available from Ciba
[54]UV absorber available from Ciba
[6]Light stabilizer available from Ciba
[7]A fumed silica dispersion consisting of 8% Areosil R812, a hydrophobic amorphous silica available from Degusa, milled in a polymer consisting of 20% hydroxy ethyl methacrylate, 30% styrene, 12% 2-ethyl hexyl acrylatr, 30% Cardura E, and 9% acrylic acid in a solvent blend of 65% aromatic 100 type and 35% xylene at 65% solids about 8K Mw.
[8]Melamine-Formaldehyde polymer solution available from Cytec
[9]Melamine-Formaldehyde polymer solution available from Cytec
[10]Phenolic functional acrylic polymers; Formulation Examples 3A to 3D correspond, respectively, to Resin Synthesis Examples 2A to 2D.
[11]A polymer consisting of 21% hydroxy ethyl methacrylate, 19% styrene, 12% n-butyl acrylate, 36% cardura E, and 12% acrylic acid, in a 60/40 blend of an aromatic 100/150 type solvent.
[12]A dispersion of 4% urea crystals in a polymer consisting of 20% hydroxy ethyl methacrylate, 30% styrene, 12% 2-ethyl hexyl acrylatr, 30% Cardura E, and 9% acrylic acid in a solvent blend of 65% aromatic 100 type and 35% xylene at 65% solids about 8K Mw.
[13]Solution of acrylic copolymers available from Byk Chemie
[14]Acid catalyst available from King Industries

Example 4

The coating composition of Example 2 was prepared, but the acrylic polyol of footnote 11 was replaced with the polymer of Resin Synthesis Example 4 in accordance with the present invention.

Examples 5A to 5D

The coating composition of Example 1 was prepared, but the acrylic polyol of footnote 13 was replaced with the polymer of Resin Synthesis Examples 5A to 5D in accordance with the present invention.

Example 6

The coating composition of Example 1 was prepared, but the acrylic polyols of footnotes 9, 13, 14, and 15 were replaced with the polymer of Resin Synthesis Example 5A in accordance with the present invention.

Example 7

The coating composition of Formulation Example 1 was prepared, but the acrylic polyols of footnotes 9, 13, 14, and 15 were replaced with the polymer of Resin Synthesis Example 5C in accordance with the present invention.

Test Substrates

The film forming compositions were spray applied to a pigmented base coat to form a color plus clear composite coating over primed electrocoated steel panels. The panels used were ACT cold roll steel panels (4 in. by 12 in.) with ED6060C electrocoat available from ACT Laboratories, Inc. The panels were coated with A-G201886-S3 Black Saphire, a black pigmented metallic water-borne base coat and A-G201309-S3 Star Silber a silver metallic water-borne base coat available from PPG Industries, Inc. The base coats were automated spray applied to the electrocoated steel panels at controlled humidity and temperature of 60% relative humidity and 70° F. temperature. The base coat was applied in two coats with a 30 second ambient flash in between coats at a film thickness of 0.5 to 0.7 mils. The panels were allowed to flash for 5 minutes under the controlled temperature and humidity conditions as the panels were sprayed. The base coated panels were then dehydrated for 5 minutes in a forced air electric oven @ 176° F.

The clear coating formulations of the examples were each automated spray applied to a base coated panel at controlled atmospheric conditions of 60% relative humidity and 70° F. in two coats with a 1 minute ambient flash between coats. Clear coat film thickness was targeted for 1.6 to 1.8 mils. All coated panels were allowed to flash for 10 minutes under the controlled atmospheric conditions before being baked. The panels were baked for 30 minutes @ 285° F. in a forced air electric oven to fully cure the coatings.

The panels were evaluated for appearance, mar resistance, hardness, acid resistance (GME 60408/GME 60409/Florida Exposure).

GME60408 Test Method: Resistance of Organic Coatings to Dilute Sulfuric Acid at Elevated Temperature

| Coating Description | Temperature at First Damage ° C. |
|---|---|
| Formulation Example 2 (Control) | 51 |
| Formulation Example 4 | 56 |

GME60409 Test Method: Resistance of Organic Coatings to Battery Acid at Room Temperature

| Coating Description | 24 Hours | 48 Hours | 72 Hours |
|---|---|---|---|
| Formulation Example 2 (Control) | 0 | 1 | 1 |
| Formulation Example 4 | 0 | 0 | 0 |

The table below illustrates the results of Florida exposure as described above:

| Coating Description | Etch Rating |
|---|---|
| Formulation Example 1 (Control) | 10 |
| Formulation Example 5A | 9 |
| Formulation Example 5B | 9 |
| Formulation Example 5D | 9 |
| Formulation Example 5C | 8.5 |
| Formulation Example 6 | 8.5 |
| Formulation Example 7 | 8.5 |

The data in the tables above demonstrate a distinct improvement in etch resistance when coating compositions of the present invention are used, comprising polymers containing o-hydroxyl aromatic functional groups, compared to film-forming compositions prepared using similar polymers without such functionality.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A curable film-forming composition comprising:
   a) a film-forming resin; and
   b) a crosslinking agent; wherein the film-forming resin comprises a polymer containing functional aromatic groups derived from functional aromatic acids having the structure:

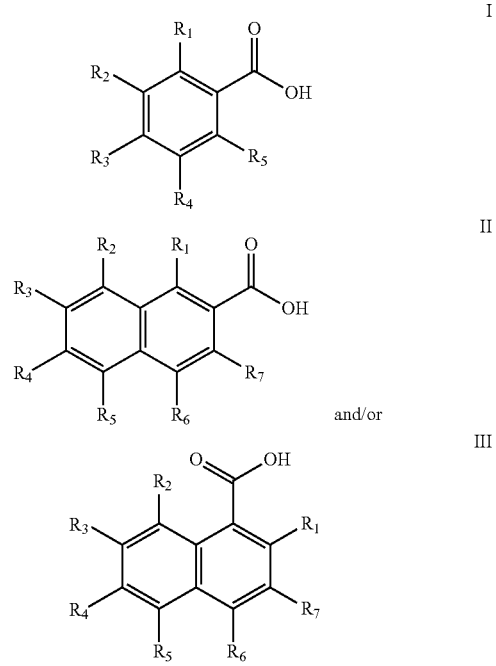

wherein substituents $R_1$ to $R_7$ are each independently —H; —OH; $C_1$ to $C_{18}$ alkyl or aryl; —OR; —OCOR; —OCO$_2$R; —NH$_2$; —NHR; —NHRR'; —NHCOR; —NRCOR'; —SH; —SR; —SCOR; where R and R' are each independently $C_1$ to $C_{18}$ aryl or alkyl; and provided that at least one of the substituents in each structure is attached to the aromatic ring through an —O—, —N—, or —S— linkage; and wherein the polymer is further prepared from an ethylenically unsaturated, beta-hydroxy ester functional monomer selected from the group consisting of:
   a) a reaction product of an ethylenically unsaturated, epoxy functional monomer and a saturated carboxylic acid having 13 to 20 carbon atoms; and
   b) a reaction product of an ethylenically unsaturated acid functional monomer and an epoxy compound which contains at least 5 carbon atoms and which is not polymerizable with the ethylenically unsaturated acid functional monomer.

2. The curable film-forming composition of claim 1, wherein the polymer containing functional aromatic groups is a reaction product of a polymer having functional groups that are reactive with carboxylic acids and at least one functional aromatic acid having structure I, II or III.

3. The curable film-forming composition of claim 1, wherein the polymer containing functional aromatic groups is prepared from an aromatic functional monomer comprising a reaction product of an acrylate or methacrylate having functional groups that are reactive with carboxylic acids and at least one functional aromatic acid having structure I, II or III.

4. The curable film-forming composition of claim 3, wherein the polymer containing functional aromatic groups is prepared from an aromatic hydroxyl functional monomer comprising a reaction product of glycidyl acrylate or methacrylate and a hydroxyl functional aromatic acid.

5. The curable film-forming composition of claim 1, wherein the film-forming resin (a) further comprises a polyester polyol.

6. A curable film-forming composition comprising:
a) a film-forming resin; and
b) a crosslinking agent; wherein the film-forming resin comprises a polymer containing hydroxyl functional aromatic groups derived from hydroxyl functional aromatic acids; and wherein the polymer is further prepared from an ethylenically unsaturated, beta-hydroxy ester functional monomer selected from the group consisting of:
   a) a reaction product of an ethylenically unsaturated, epoxy functional monomer and a saturated carboxylic acid having 13 to 20 carbon atoms; and
   b) a reaction product of an ethylenically unsaturated acid functional monomer and an epoxy compound which contains at least 5 carbon atoms and which is not polymerizable with the ethylenically unsaturated acid functional monomer.

7. The curable film-forming composition of claim 6, wherein the polymer containing hydroxyl functional aromatic groups is a reaction product of a polymer having functional groups that are reactive with carboxylic acids and a hydroxyl functional aromatic acid.

8. The curable film-forming composition of claim 7, wherein the hydroxyl functional aromatic acid comprises o-hydroxy benzoic acid, 3,4-dihydroxybenzoic acid, 3,5-dihydroxybenzoic acid, 3-hydroxybenzoic acid, 5-hydroxy-2-methylbenzoic acid, 3-hydroxy-4-methylbenzoic acid, 2,3-dihydroxybenzoic acid, 2,5-dihydroxybenzoic acid, 4-hydroxybenzoic acid, 4-hydroxy-3-methylbenzoic acid, 4-hydroxy-2-methylbenzoic acid, 3,4-dihydroxybenzoic acid, 2,6-dihydroxybenzoic acid, 2,4-dihydroxybenzoic acid, 5-fluorosalicylic acid, 4-fluorosalicylic acid, 2-6-hydrobenzoic acid, 3-methylsalicylic acid, 5-methylsalicylic acid, 4-methylsalicylic acid, 3,4,5-trihydroxybenzoic acid, 2,4,5-trihydroxybenzoic acid, 2,3,4-trihydroxybenzoic acid, 2-hydroxy-3-methoxybenzoic acid, 4-hydroxy-3-methoxybenzoic acid, 2-hydroxy-5-methoxybenzoic acid, 3-hydroxy-4-methoxybenzoic acid, 1-hydroxy-2-naphthoic acid, 6-hydroxy-2-naphthoic acid, and/or 3-hydroxy-2-naphthoic acid.

9. The curable film-forming composition of claim 6, wherein the polymer containing hydroxyl functional aromatic groups is prepared from an aromatic hydroxyl functional monomer comprising a reaction product of an acrylate or methacrylate having functional groups that are reactive with carboxylic acids and a hydroxyl functional aromatic acid.

10. The curable film-forming composition of claim 9, wherein the polymer containing hydroxyl functional aromatic groups is prepared from an aromatic hydroxyl functional monomer comprising a reaction product of glycidyl acrylate or methacrylate and a hydroxyl functional aromatic acid.

11. The curable film-forming composition of claim 9, wherein the polymer is prepared from at least one other ethylenically unsaturated monomer that does not contain hydroxyl functional aromatic groups.

12. The curable film-forming composition of claim 11, wherein the polymer is prepared from 2-ethylhexyl acrylate, styrene, methyl methacrylate, ethyl methacrylate, butyl methacrylate, ethyl acrylate, butyl acrylate, lauryl methacrylate, and/or isobornyl methacrylate.

13. The curable film-forming composition of claim 9, wherein 5 to 40 percent by weight of the monomers used to prepare the polymer comprises the aromatic hydroxyl functional monomer.

14. The curable film-forming composition of claim 9, wherein 25 to 40 percent by weight of the monomers used to prepare the polymer comprises the aromatic hydroxyl functional monomer.

15. The curable film-forming composition of claim 9, wherein the hydroxyl functional aromatic acid comprises o-hydroxy benzoic acid, 3,4-dihydroxybenzoic acid, 3,5-dihydroxybenzoic acid, 3-hydroxybenzoic acid, 5-hydroxy-2-methylbenzoic acid, 3-hydroxy-4-methylbenzoic acid, 2,3-dihydroxybenzoic acid, 2,5-dihydroxybenzoic acid, 4-hydroxybenzoic acid, 4-hydroxy-3-methylbenzoic acid, 4-hydroxy-2-methylbenzoic acid, 3,4-dihydroxybenzoic acid, 2,6-dihydroxybenzoic acid, 2,4-dihydroxybenzoic acid, 5-fluorosalicylic acid, 4-fluorosalicylic acid, 2-6-hydrobenzoic acid, 3-methylsalicylic acid, 5-methylsalicylic acid, 4-methylsalicylic acid, 3,4,5-trihydroxybenzoic acid, 2,4,5-trihydroxybenzoic acid, 2,3,4-trihydroxybenzoic acid, 2-hydroxy-3-methoxybenzoic acid, 4-hydroxy-3-methoxybenzoic acid, 2-hydroxy-5-methoxybenzoic acid, 3-hydroxy-4-methoxybenzoic acid, 1-hydroxy-2-naphthoic acid, 6-hydroxy-2-naphthoic acid, and/or 3-hydroxy-2-naphthoic acid.

16. The curable film-forming composition of claim 6, wherein the film-forming resin (a) further comprises a polyester polyol.

17. The curable film-forming composition of claim 6, wherein the crosslinking agent comprises an aminoplast, polyisocyanate, polyacid, and/or anhydride.

* * * * *